2,411,333

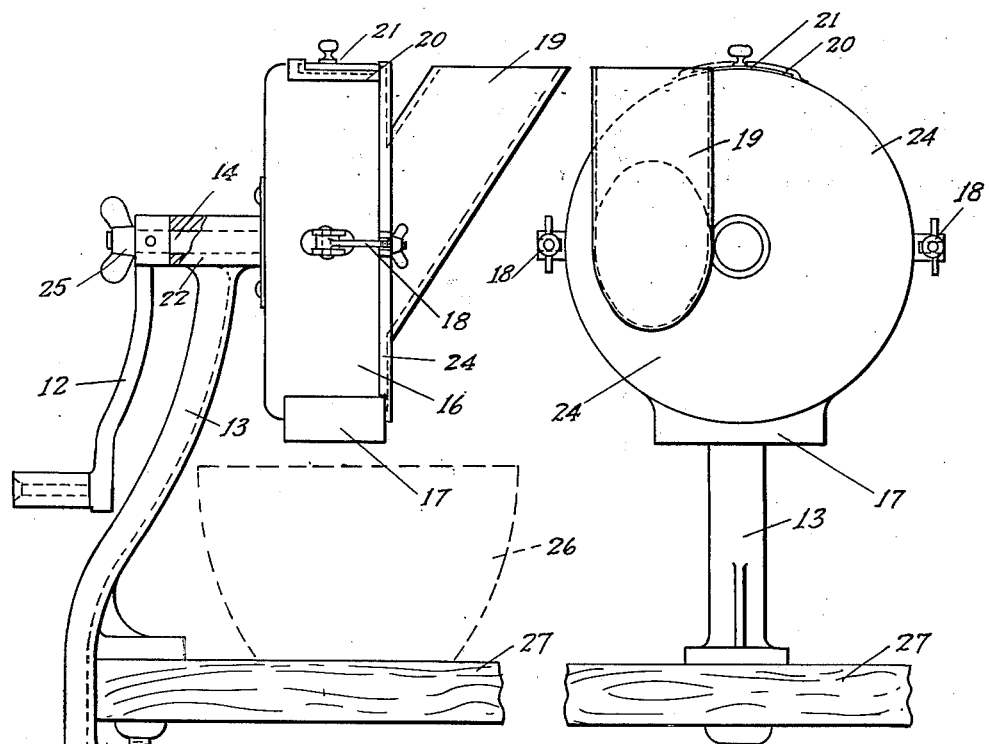
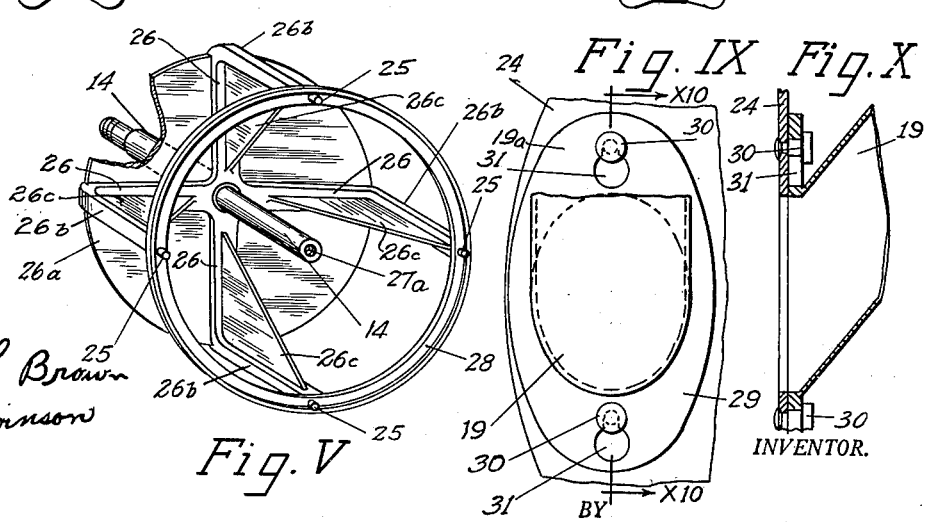

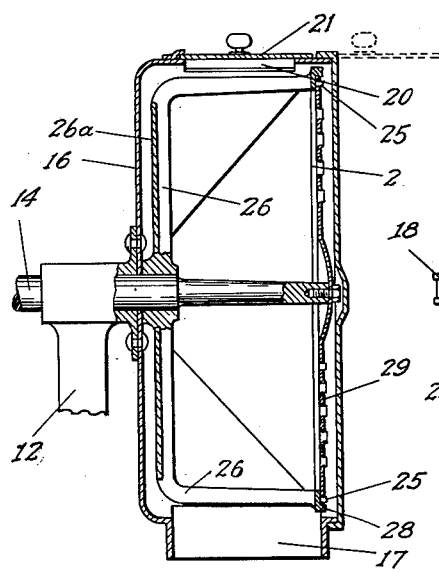
Fig. IV
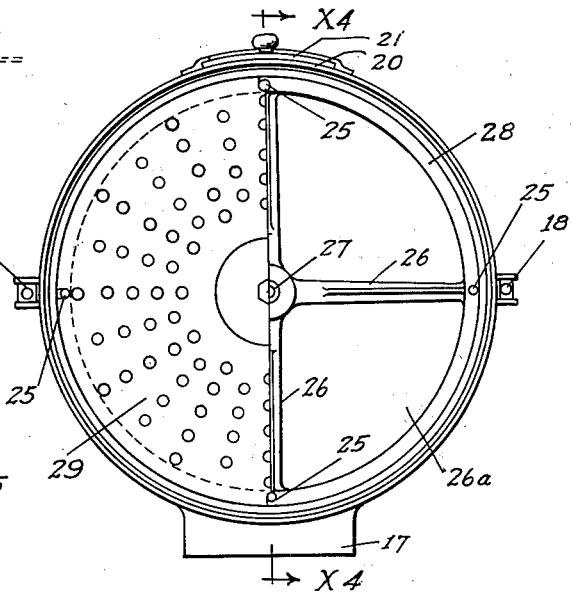
Fig. III
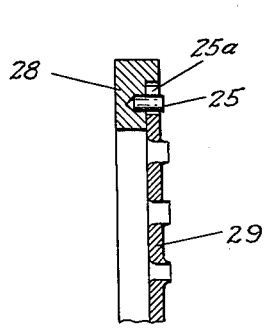
Fig. VII
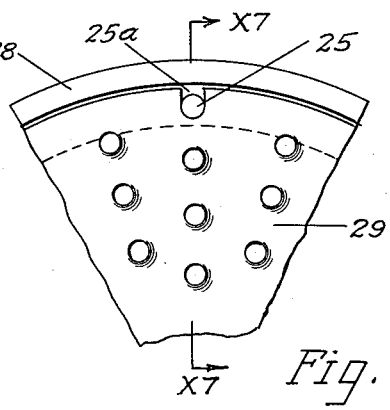
Fig. VI
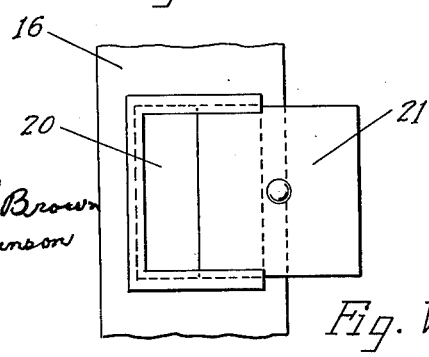
Fig. VIII Patented Nov. 19, 1946

UNITED STATES PATENT OFFICE 2,411,333

MACHINE FOR SHREDDING, GRATING, AND/OR SLICING FOODSTUFFS

Louis Orland, Los Angeles, Calif.

Application June 15, 1943, Serial No. 490,852

2 Claims. (Cl. 146—177)

My invention is a machine, operated by hand, electric, or any other power, and the aforenamed machine shreds, grates or slices foodstuffs or any edible material which may be consumed by man or animal.

An important object of my invention is to provide a machine which will grate, shred or slice food materials.

Other objects and advantages of the invention will be apparent during the course of the following description.

In the accompanying drawings, forming a part of this specification, like numerals are employed to designate like parts throughout the same.

Referring particularly to the drawings:

Figure 1 is a side elevation of my invention, "Orland's Shredderex."

Figure 2 is a front elevation of my invention.

Figure 3 is a front elevation of the body showing half the shredding disc in place and showing half the spider to which the shredding disc is attached.

Figure 4 is a cross section view on line x4—x4 of Figure 3 looking in the direction of the appended arrows.

Figure 5 is an isometric view of the rotating spider which holds the shredding disc.

Figure 6 is a front elevation of a segment of the shredding disc.

Figure 7 is a cross-section view on line x7—x7 of Figure 6 looking in the direction of the appended arrows.

Figure 8 is a fragmentary top plan view showing the movable door which slides over an opening on the top of the machine.

Figure 9 is a fragmentary front elevation showing a detachable hopper.

Figure 10 is a section on line x10—x10 of Figure 9, looking in the direction of the appended arrows.

The invention consists of a body 16 of preferably cylindrical shape, mounted on a frame 13, which may be clamped to a table top by means of a clamp screw 11. Through a boss 22 a shaft 14, rotated by a suitable handle 12, projects into the body 16, and to said shaft is attached a spider 26 with an integral rear disc 26a and a front ring 28. Spider 26 includes horizontal arms 26b disposed between the periphery of disc 26a and ring 28, and carried by said arms and arranged between said disc and ring are thin triangular plates 26c that serve as agitators or stirrers for the product sliced, grated or shredded in the machine. A grating disc 29 is detachably mounted on ring 28 and held in place by a screw 27 in a drilled and tapped hole 27a in the end of shaft 14.

The disc 29 is driven by means of dowels 25 attached in the ring 28, these dowels engage in slots 25a, of the disc.

A cover plate 24 is attached to the body with a locking rim and fastened in place by the hinged screw 18—18 and fly nuts or any suitable means of like nature.

An aperture 20 at the top of the body 16 is provided for clean-out purposes, opening being closed during use by a slidably mounted cover plate 21.

In dis-assembling, the fly nut 25 is removed and the shaft carrying the spider is drawn out of its bearing 22. An outlet 17 in the bottom of the body is provided for discharge of shredded material into any suitable container.

In Figure 9 is shown a detachable hopper 19 with a flange 19a, in said flange are keyhole slots 31, which engage with studs 30, the latter being riveted into cover plate 24; various alternate types of hoppers may be substituted.

A description of the machine and its use follows:

The machine, having been fastened to a suitable table top by means of the clamp, food material is placed in the hopper and held with a certain amount of pressure against the face of the disc 29 which is then rotated by means of hand or electric power, through a shaft and a spider rotatably mounted within the body of the machine.

Various types of grater discs may be used.

As the grater or cutting disc is rotated against the food, small particles or slices are cut and pass through the apertures and fall into the body of the machine. The spider particularly arms 26 and plates 26c agitates the shredded particles, preventing them from clogging, and causing them to fall through the outlet provided at the bottom of the body, into a suitable receptacle as shown in the drawings.

Having described my invention, I claim:

1. In a food comminuting machine, a housing having top and bottom openings, a horizontal shaft journalled in said housing, a one-piece spider carried by said shaft within said housing, said spider comprising a rear disc, a front ring and material agitating arms connecting the periphery of said disc and ring and triangular plates on said arms between said rear disc and said ring, a disc removably mounted on said ring and provided on its outer face with sharp projections for engaging and cutting or shredding material, a removable cover plate closing the front of said housing, said cover plate having an eccentrically disposed material inlet and a hopper detachably mounted on said cover plate over the material inlet opening.

2. In a food comminuting machine, a housing having top and bottom openings, a horizontal rotatable shaft journalled in the center of the housing, a one-piece spider mounted on the shaft and substantially filling the housing, said spider comprising a vertical rear disc, a vertical front ring, horizontal arms connecting the periphery of the disc and radially extending triangular agitator plates on the arms between the rear disc and the front ring, a comminuting disc removably mounted on the front ring provided with apertures having sharp front edges, and means for feeding material through the disc openings and into the path of travel of the triangular agitator plates, said bottom opening constituting a discharge for material received from the agitator plates.

LOUIS ORLAND.